C. T. FAIRCHILD.
Machine for Cutting Veneers.
No. 200,996. Patented March 5, 1878.
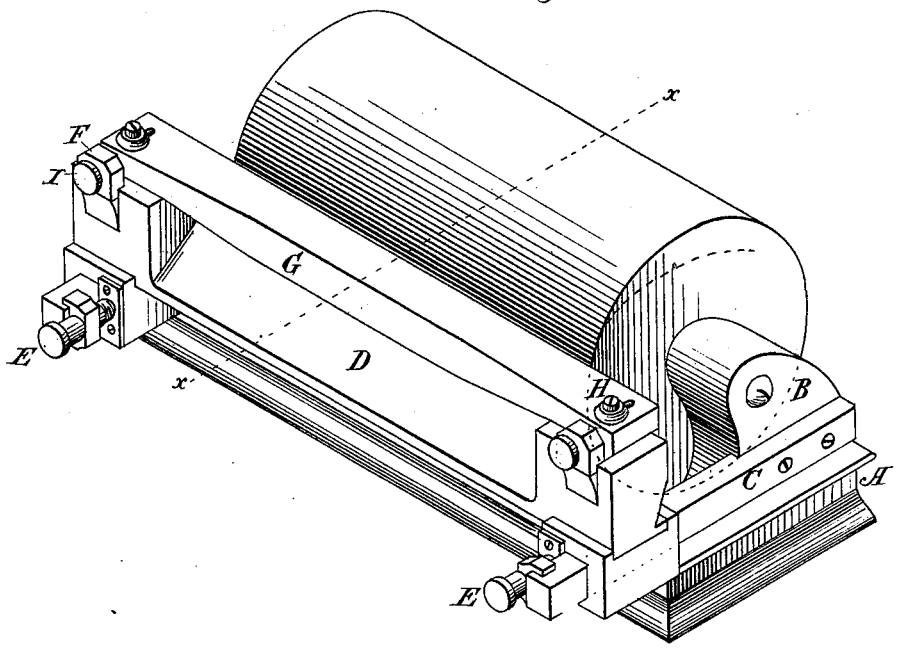
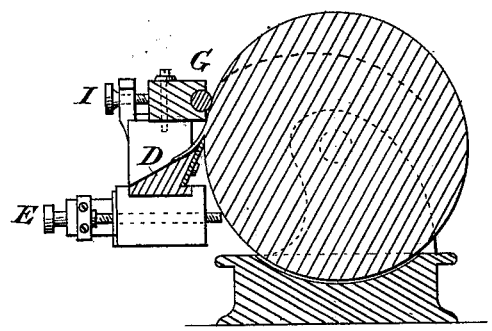
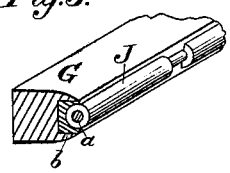
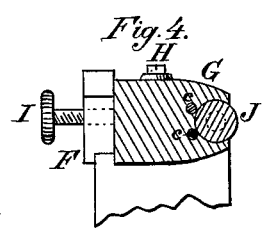

UNITED STATES PATENT OFFICE.

CURTISS T. FAIRCHILD, OF SALISBURY, ASSIGNOR TO BURRELL, IVES & CO., OF LITTLE FALLS, NEW YORK.

IMPROVEMENT IN MACHINES FOR CUTTING VENEERS.

Specification forming part of Letters Patent No. 200,996, dated March 5, 1878; application filed January 25, 1878.

*To all whom it may concern:*

Be it known that I, CURTISS T. FAIRCHILD, of Salisbury, in the county of Herkimer and State of New York, have invented certain new and useful Improvements in Veneer-Cutting Machines; and I do hereby declare that the following is a full, clear, and exact description thereof, which will enable others skilled in the art to which it appertains to make and use the same, reference being had to the accompanying drawings, and to letters of reference marked thereon, which form a part of this specification.

This invention relates, principally, to an improvement in that class of veneer-cutting machines in which the log from which the veneers are to be cut is mounted upon centers and rotated against the edge of a cutting-knife which moves toward the log at a regulated speed, the primary object being, by the employment in such machines of a peculiarly-constructed pressure-roll bearing upon the log, and so adjusted relatively to the cutting-knife and to the centers of rotation whereon the log turns, to prevent those having wind-shakes or other cracks from slabbing off under the action of the cutting-knife upon the outer parts, which may be separated from the solid portion of the log by the cracks or shakes when they run in such direction that the knife severs them diagonally, thus tending to lift or split off such parts; and a further object is, by the use of a roll-supporting bar provided with a concavity for the reception of the roll, and within which it revolves, being supported therein by friction-rollers placed behind it, or small and short journals and bearings at different points of its length, thereby acting as a support to the pressure-roll, to relieve it from excessive friction and enable it to successfully resist the great strains to which it is at times subjected.

In the accompanying drawings, Figure 1 is a perspective view of the machine with a log between the centers as when the machine is in operation. Fig. 2 is a vertical section on the line $x\,x$ of Fig. 1. Fig. 3 presents a front view of the pressure-roll and its supporting-bar. Fig. 4 shows a modification of the pressure-roll and its supporting-bar, in which the roll is supported by a series of friction-rollers within the concave recess of the bar.

In cutting veneers from logs it is found that many of them have cracks or shakes extending eccentrically to the center and partially around the log, as shown by the dotted lines in Fig. 2. These slabs are liable to be lifted up by the cutting-knife, split off, and lost, unless some special provision is made for their retention in place during the operation of cutting them into veneers, to effect which I provide the machine with a pressure-roll placed in advance of the ordinary gage roll or bar, which regulates the thickness of the veneer being cut, so that it shall hold all slabs firmly against the body of the log before reaching and while being cut by the knife.

In order to make this roll practically operative, it is necessary that it be of small diameter, and that it revolve freely in its bearings, so that when it comes in contact with the slab it shall readily revolve with it, and not tend to force it off, as would be the case were a bar used in its place, or a roll which did not freely revolve in its bearings.

A is the bed of the machine, constructed in the ordinary manner and supporting the head-blocks B, which carry the centers and mechanism for imparting rotation to the log, which mechanism may be of any of the well-known varieties commonly employed for that purpose. C C are the ways upon which the knife-bar D is moved by means of the screws E, which are ordinarily provided with gears at their outer ends connecting with corresponding gear-wheels upon a horizontal shaft, receiving motion from the main driving-shaft of the machine, thus causing the rotation of the feeding-screws E to be in accordance with that of the log, insuring an equable advance of the cutting-knife, and the production of veneers of regular thickness.

Secured to the ends of the knife-bar D, or to a sliding frame upon which it is carried, are lugs or brackets F, upon which slides the roll-supporting bar G. This bar is made heavy, so as to be perfectly rigid under all the strains to which it may be subjected, to accomplish which more fully, and at the same time economize material, it may be enlarged at the middle of its length, gradually tapering toward its ends, as shown in Fig. 1. The ends of the bar, where they rest upon the brackets F, are slotted transversely to allow the passage of bolts H, by which it is secured firmly in place after having been properly adjusted with relation to the log by means of the set-screws I, which pass through the upwardly-projecting portion of the bracket and bear against the rear of the bar G near its ends.

A concave recess is formed in the front side of the bar of such depth as to receive nearly one-half the pressure-roll J, which may be provided with journals $a$ at different points in its length. These journals revolve in bearings $b$, inserted into or forming a part of the bar G. The number of these journals and bearings will depend upon the size and length of the roll J, a sufficient number being employed to keep the face of the roll in line from end to end—or, in other words, they are placed at such intervals as will practically prevent the springing of the roll at any point between them.

Should it be desirable to preserve a continuous bearing-face on the roll, in order to prevent marking the face of the veneer, or for other reasons, its friction upon the supporting-bar may be relieved by inserting friction-rollers $c$ into suitable recesses formed within the concavity of the bar, as illustrated in Fig. 4 of the drawings. But this method of constructing the apparatus is more expensive. For all ordinary work, such as cutting veneers for barrels, boxes, picture-backs, and the like, I therefore prefer the method of construction first described.

In cases where the machine is intended for cutting veneers of great length, the roll may be made in two or more pieces, each of them being supported in the manner described. It is also obvious that a roller supported in this manner may be used as a gage to regulate the thickness of the veneers cut by placing it at a point opposite, or nearly opposite, the edge of the cutting-knife. It may also be used as a gage to determine the thickness of the veneer in such machines as reciprocate instead of revolving the log, with equally good results.

Having thus described my invention, I claim as new, and desire to secure by Letters Patent, the following:

1. In a veneer-cutting machine, a pressure-roller supported at the ends and at intervals by journals of less diameter than the roll, whereby excessive friction is avoided, in combination with a recessed supporting-bar that partly incloses the roll and supports it in fixed bearings, substantially as and for the purpose specified.

2. In a veneer-cutting machine, a pressure-roller supported at its ends and at intervals by journals of less diameter than the roll, in combination with a supporting-bar, G, said bar having friction-rollers inserted into recesses formed in the concavity thereof, for the purpose of relieving the friction of the roller, while it is made to bear with equal pressure upon the face of the log during its whole length, substantially as and for the purpose specified.

3. The recessed supporting-bar G, provided with the bearings $b$, in combination with roll J, constructed with journals $a$, which revolve in the bearings $b$, for the purpose of stiffening and relieving the friction of the roll, as set forth.

In testimony that I claim the foregoing as my own I hereunto affix my signature in presence of two witnesses.

CURTISS T. FAIRCHILD.

Witnesses:
C. VAN VECHTEN,
WATTS T. LOOMIS.